United States Patent [19]

Takayama et al.

[11] Patent Number: 5,644,447
[45] Date of Patent: Jul. 1, 1997

[54] RECORDING OR REPRODUCING APPARATUS HAVING FUNCTION OF SEARCHING FOR UNRECORDED PART

[75] Inventors: Nobutoshi Takayama, Kanagawa-ken; Hiroaki Furuyama, Tokyo, both of Japan

[73] Assignee: Canon Kabushiki Kaisha, Tokyo, Japan

[21] Appl. No.: 569,553

[22] Filed: Dec. 8, 1995

Related U.S. Application Data

[63] Continuation of Ser. No. 279,698, Jul. 25, 1994, abandoned, which is a continuation of Ser. No. 841,849, Feb. 26, 1992, abandoned.

[30] Foreign Application Priority Data

Mar. 1, 1991 [JP] Japan ................................. 3-036163
Mar. 19, 1991 [JP] Japan ................................. 3-052925

[51] Int. Cl.⁶ .................................................. G11B 27/22
[52] U.S. Cl. ................................... 360/72.2; 360/74.4
[58] Field of Search .............................. 360/72.1, 72.2, 360/74.4, 64, 71, 38.1; 386/2, 3, 47, 48, 49, 50, 51

[56] References Cited

U.S. PATENT DOCUMENTS

| | | | |
|---|---|---|---|
| 4,404,604 | 9/1983 | Ueki et al. | 360/71 |
| 4,542,427 | 9/1985 | Nagai | 360/72.1 |
| 4,553,180 | 11/1985 | Hasagawa | 360/74.4 |
| 4,636,878 | 1/1987 | Murayama | 360/71 |
| 4,651,230 | 3/1987 | Hagita et al. | 360/38.1 X |
| 4,689,699 | 8/1987 | Harigaya et al. | 360/74.4 |
| 4,760,474 | 7/1988 | Takimoto | 360/64 |
| 4,766,507 | 8/1988 | Kashida et al. | 360/72.2 |
| 4,939,595 | 7/1990 | Yoshimoto et al. | 360/19.1 |
| 5,109,305 | 4/1992 | Ohsawa et al. | 360/64 |

FOREIGN PATENT DOCUMENTS

2083681  3/1982  United Kingdom.

*Primary Examiner*—Aristotelis M. Psitos
*Assistant Examiner*—James L. Habermehl
*Attorney, Agent, or Firm*—Robin, Blecker, Daley & Driscoll

[57] ABSTRACT

An information signal recording and/or reproducing apparatus is arranged to be capable of quickly and accurately discriminating between recording and unrecording of an information signal on a tape-shaped recording medium by detecting all of signals sequentially reproduced from the tape-shaped recording medium by a plurality of rotary heads which trace the tape-shaped recording medium. The real end part of any existing record can be accurately detected by transporting the tape-shaped recording medium in a direction reverse to the direction taken in recording, according to the result of the discrimination; and by initializing a counter which counts pulses generated according to the transport of the recording medium, in response to the recording of the information signal being detected in process of transporting the tape-shaped recording medium in the reverse direction.

14 Claims, 5 Drawing Sheets

This is a continuation application under 37 CFR 1.62 of prior application Ser. No. 08/279,698, filed on Jul. 25, 1994 now abandoned which is a continuation application under 37 CFR 1.62 of prior application Ser. No. 07/841,849, filed Feb. 26, 1992, now abandoned.

BACKGROUND OF THE INVENTION

1. Field of the Invention

This invention relates to a recording or reproducing apparatus, and more particularly to a recording or reproducing apparatus having the function of searching a recording medium for an unrecorded part of the medium where no signal has been recorded as yet.

2. Description of the Related Art

It has been known to arrange a recording/reproducing apparatus such as a VTR or the like to have a function called an end search function. The end search function is performed, under the control of a system controller, to automatically search a recording medium, such as a magnetic tape, for the end part of an existing record, or the forefront part of an unrecorded area on the magnetic tape, in cases where, for example, another record is to be recorded after the existing record on the magnetic tape.

Figures 1A, 1B, 1C:
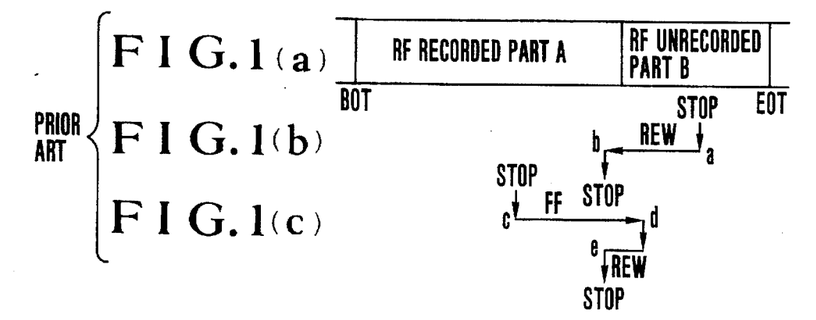
FIGS. 1(a), 1(b) and 1(c) schematically show a searching action for the record end part in the conventional VTR.
Figure 2:
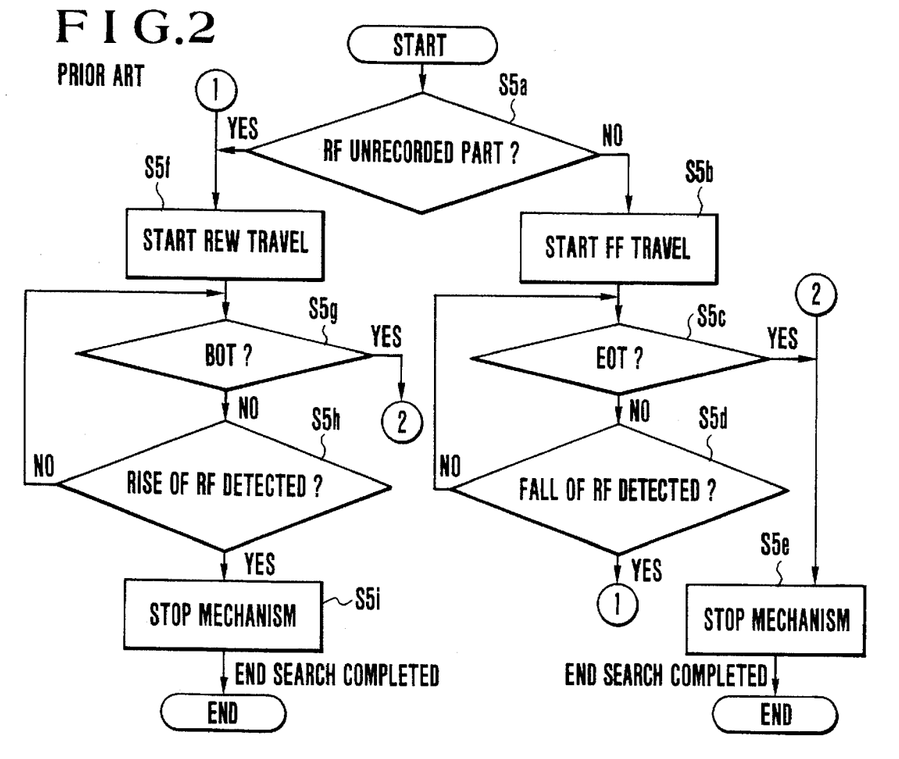
FIG. 2 is a flow chart showing the searching action for the record end part in the conventional VTR.

FIGS. 1(a), 1(b) and 1(c) of the accompanying drawings show the procedure of an end search to be made by the conventional VTR. FIG. 2 shows in a flow chart a control operation on the end search. Of these figures, FIG. 1(a) shows a magnetic tape on which a video signal has already been recorded. FIGS. 1(b) and 1(c) show the positions of a recording/reproducing head in relation to the magnetic tape. The operation of the conventional VTR is described by way of example with reference to FIGS. 1(a), 1(b), 1(c) and 2 as follows:

Referring to FIGS. 1(a), 1(b) and 1(c), upon receipt of an instruction for the end search, the system controller performs the control in one of two different manners according to whether or not the recording/reproducing head is located in a position A on the magnetic tape where the video signal is recorded (hereinafter referred to as an RF recorded part):

If the head is currently located in a position B where the video signal is not recorded (hereinafter referred to as an RF unrecorded part), the VTR is set in a tape rewinding mode (hereinafter referred to as an REW travel mode) for rewinding the magnetic tape from a current stop position "a" as shown in FIG. 1(b). The end part "b" of the existing record is detected by detecting the rise of an RF signal reproduced in the REW travel mode. Upon detection of the record end part "b", the system controller sets the VTR in a stop mode to bring the travel of the magnetic tape to a stop. The end search is then completed.

In a case where the current position of the head is an RF recorded part A, the system controller sets the VTR in a fast forward mode (hereinafter referred to as an FF travel mode), as shown in FIG. 1(c). Then, the tape is caused to travel forward at a high speed from a current stop position "c". The end part "d" of the existing record is detected by detecting the fall of an RF signal reproduced in the FF travel mode. Upon detection of the record end part "d", the system controller sets the VTR in the REW travel mode. After that, the VTR is set in the stop mode when a rise "e" of an RF signal reproduced in the REW travel mode is detected, in the same manner as mentioned above, and the end search is completed.

Referring to the flow chart of FIG. 2, the end search operation of the conventional VTR is described briefly as follows: After a start is made, the flow of operation comes to a step S5a to check the current position of the head on the tape to find if the head is at the RF unrecorded part B. If not, the flow proceeds to a step S5b. At the step S5b: A fast forward action, i.e., the FF travel of the tape, begins. At a step S5c: A check is made to find if the head is at a tape end part (hereinafter referred to as the EOT). If the head is found to be at the EOT, the flow comes to a step S5e. At the step S5e: The action of an applicable mechanism is brought to a stop to bring an end search to an end. If the head is found to be not at the EOT at the step S5c, the flow proceeds to a step S5d. At the step S5d: A check is made to find if a fall of an RF signal has been detected. If so, the flow comes to a step S5f to cause the REW travel of the tape to begin.

If the head is determined, at the step S5a, to be at the RF unrecorded part B, the flow comes from the step S5a to a step S5f. At the step S5f: The REW travel of the tape is caused to begin. At a step S5g: A check is made to find if the head is at the beginning part of the tape (hereinafter referred to as the BOT). If so, the flow comes to the step S5e. If not, the flow proceeds to a step S5h. At the step S5h: A check is made to find if a rise of an RF signal has been detected. If so, the flow proceeds to a step S5i. At the step S5i: The action of the applicable mechanism is brought to a stop to bring the end search to an end. If the rise of any RF signal is found to have not been detected as yet at the step S5h, the flow comes back to the step S5g.

In the case of the conventional VTR described above, a fall of an RF signal reproduced is arranged to be detected in the FF (fast forward) travel mode. Therefore, a space at a joint part between RF recorded parts on the tape tends to be mistakenly detected as the end part of the RF recorded part. If any signal is recorded following such mistaken detection, the contents of the RF recorded part after the joint part would be lost. Such faulty recording, therefore, presents a serious problem.

Further, in the conventional VTR, the rise of a reproduced RF signal is arranged to be detected in the REW travel mode; and the end search is brought to an end by bringing the VTR into a stop mode upon detection of the rise of the reproduced RF signal. However, this arrangement makes it impossible to find by a searching action an optimum record end part for tag recording. More specifically, the search would be made to detect a point which is located before the actual record end part, i.e., on the side of the BOT. Another problem lies in that: While the tag recording is intended to be made from the end part of the existing record, the arrangement of the VTR to terminate the end search in the stop mode causes a further discrepancy in search position when the operation mode of the VTR is shifted from the stop mode to a recording standby mode for the tag recording. In addition, it has been impossible to make a confirmation as to whether the point detected is the actual end of the existing record when the stop mode is shifted to the standby mode for the tag recording.

Further, in the field of the VTR, there has been known an art for replacing a reproduced video signal with a given self oscillating image signal (called blue back, etc.) for the purpose of making a reproduced picture more easily sightable when a reproducing action on the tape comes to an unrecorded part of the tape. In making a search for an unrecorded part in this manner, the system for monitoring reproduced RF signals over a given length of time in the above-stated manner has come to require a longer monitoring period, because of the diverse reproduction modes. In other words, there are modes of varied kinds including a slow motion reproduction mode; modes of recording at different tape transporting speeds; and reproduction of a record from such a recording tape that does not permit easy tracking control, like performing a reproducing action with a VTR of the NTSC system on a tape on which signals of the PAL system are recorded. These modes necessitate a monitoring action on the reproduced RF signals over a relatively long period of time.

Further, in cases where the above-stated monitoring action is to be performed by means of a microprocessor, a limitation imposed on software arrangement sometimes prevents securing a sufficiently long period of monitoring time. Erroneous detection and faulty actions thus have resulted from an insufficient length of the monitoring time.

SUMMARY OF THE INVENTION

Such being the background, this invention is directed to the solution of the above-stated problems.

It is, therefore, an object of the invention to provide a signal recording or reproducing apparatus which is capable of speedily and reliably carrying out a search for an unrecorded part of a tape-shaped recording medium.

Under this object, an information signal recording and/or reproducing apparatus arranged as an embodiment of this invention comprises: a plurality of rotary heads arranged to sequentially trace a tape-shaped recording medium; detection means for detecting signals sequentially reproduced by the plurality of rotary heads; extracting means for sequentially extracting outputs of the detection means for every one of the plurality of rotary heads; and discriminating means for discriminating between recording and unrecording of an information signal on the tape-shaped recording medium by using outputs of the extracting means for all of the plurality of rotary heads.

It is another object of the invention to provide a signal recording or reproducing apparatus which is capable of reliably and accurately making a search for the leading point of an unrecorded part, i.e., the end part of a recorded part, of a tape-shaped recording medium.

Under that object, an information signal recording and/or reproducing apparatus which is arranged as another embodiment of this invention comprises transport means for transporting a tape-shaped recording medium; a rotary head arranged to trace the tape-shaped recording medium; discriminating means for discriminating between recording and unrecording of an information signal on the tape-shaped recording medium by using a signal reproduced from the tape-shaped recording medium by the rotary head; pulse generating means for generating pulses according to the transport of the tape-shaped recording medium; count means for counting the pulses generated; and control means for controlling an action of the transport means and that of the count means in response to the discriminating means, the control means being arranged to cause the tape-shaped recording medium to be transported in a direction reverse to the direction in which the tape-shaped recording medium is transported during recording, in response to the discriminating means detecting the unrecording of the information signal for a predetermined period of time or more, and to initialize the count means in response to the discriminating means detecting the recording of the information signal in process of transporting the tape-shaped recording medium in the reverse direction.

The above and other objects and features of the invention will become apparent from the following detailed description of embodiments thereof taken in connection with the accompanying drawings.

DETAILED DESCRIPTION OF THE PREFERRED EMBODIMENTS

Figure 3:
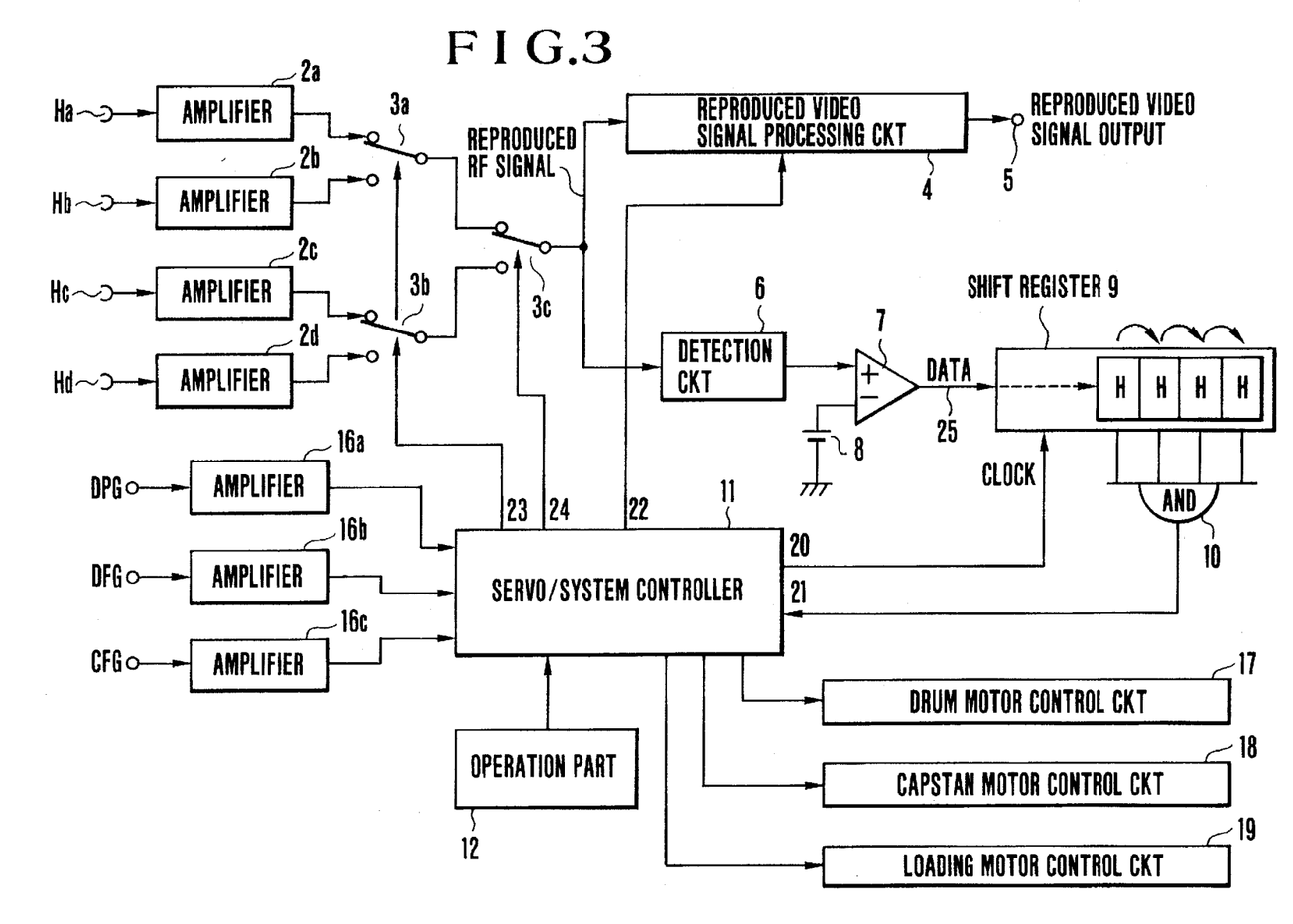
FIG. 3 is a block diagram showing in outline the arrangement of a video tape recorder (VTR) arranged as an embodiment of this invention.
Figure 4:
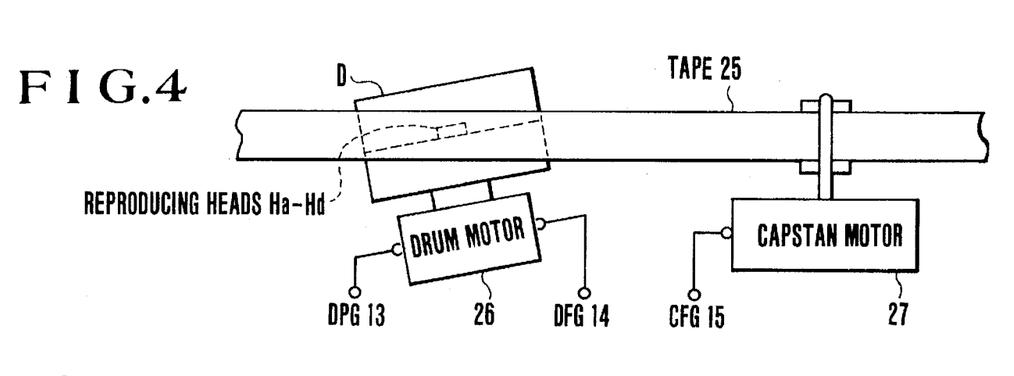
FIG. 4 schematically shows in outline the arrangement of the tape transport system of the VTR of FIG. 3.

The following describes some of the preferred embodiments of this invention:

FIG. 3 is a block diagram showing in outline the arrangement of a video tape recorder (VTR) arranged as an embodiment of the invention. FIG. 4 schematically shows in outline the arrangement of the tape transport system of the VTR of FIG. 3.

Referring to FIG. 3, the VTR includes reproducing rotary heads Ha, Hb, Hc and Hd. Reproduction amplifiers 2a, 2b, 2c and 2d are arranged to respectively amplify signals reproduced by the reproducing rotary heads Ha, Hb, Hc and Hd. Switches 3a, 3b and 3c are arranged to selectively output the signals reproduced by the four reproducing heads according to the rotating phases of the reproducing rotary heads.

In the case of this VTR, a tape 25 is wrapped at least 270 degrees around a drum D as shown in FIG. 4. The four reproducing rotary heads Ha to Hd are arranged to sequentially reproduce one field amount of a video signal by rotating at a phase difference of 90 degrees in the order of the heads Ha, Hb, Hc and Hd. As well known, the heads Ha and Hc have the same azimuth angle while the heads Hb and Hd have the same azimuth angle different from that of the heads Ha and Hc.

A reproduced video signal processing circuit 4 is arranged to reproduce a video signal from reproduced RF signals obtained via the switches 3a, 3b and 3c. An output terminal 5 is arranged to output the reproduced video signal. A detection circuit 6 is arranged to detect the the reproduced RF signal. A comparator 7 is arranged to output a high level signal when the detection output of the detection circuit 6 is below a given voltage level. In other words, when the output signal of the comparator 7 is at a high level, it indicates that the reproduced RF signal is below a given level.

A reference voltage generator 8 is arranged to define a reference level to be used at the comparator 7 for comparison. A shift register 9 receives, as input data 25, the output of the comparator 7 which is a binary signal (having high and low levels). The shift register 9 is arranged to hold and shift the input data 25 according to a clock signal 20. An AND circuit 10 is arranged to receive in parallel the outputs of the shift register 9 from a plurality (four) of ports which are provided for taking out data from inside of the shift register 9.

A servo/system controller 11 which is arranged to control various parts of the VTR consists of a microprocessor and its peripheral circuits.

In the case of this VTR, the servo/system controller 11 forms control signals by software for controlling a drum motor 26 and a capstan motor 27 which are shown in FIG. 4. The signal inputs to the servo/system controller 11 include a drum-rotational-frequency detection signal 14 (hereinafter referred to as a DFG signal) which indicates the rotational frequency of the drum motor 26 detected, a drum-rotational-phase detection signal 13 (hereinafter referred to as a DPG signal) which indicates the rotational phase of the drum D and a capstan-rotational-frequency detection signal 15 (hereinafter referred to as a CFG signal). By using these input signals, the servo/system controller 11 forms and supplies a drum rotation control signal to a drum motor control circuit 17 and a capstan rotation control signal to a capstan motor control circuit 18, respectively. The details of a software servo for this purpose are well known and require no detailed description as the software is not directly related to this invention.

An operation part 12 is provided for determining the operation mode of the VTR. A tape loading motor control circuit 19 is arranged to operate in accordance with an operation performed on the operation part 12.

The details of a detecting operation for an unrecorded part in the VTR of this embodiment are described below with reference to FIG. 5 which is a timing chart:

In the case of this embodiment, the VTR is arranged to normally and constantly make a discrimination between an unrecorded part and a recorded part in the reproduction mode. However, the reproduction amplifiers 2a, 2b, 2c and 2d are operated also when an instruction, such as a blank search instruction, is given from the operation part 12 for detecting an unrecorded part.

The reproduced RF signal which has been detected by the detection circuit 6 is compared at the comparator 7 with a reference voltage generated by the reference voltage generator 8 as mentioned above. In a case where the output of the detection circuit 6 is found to be lower than the reference voltage, a high level output is obtained from the comparator 7.

Meanwhile, the servo/system controller 11 acts to form a control signal for controlling the rotation of the drum motor 26 on the basis of the DPG signal 13 and the DFG signal 14. In synchronism with the signal forming action, head switching pulse signals 23 and 24 are outputted to operate the switches 3a, 3b and 3c for the reproduced RF signal. The head switching pulse signals 23 and 24 are as shown in FIG. 5. As apparent from FIG. 5, the outputs of the reproducing rotary heads Ha, Hb, Hc and Hd are sequentially outputted through the switching actions of these switches. As a result, a continuous reproduced RF signal is obtained from the output terminal of the switch 3c.

Figure 5:
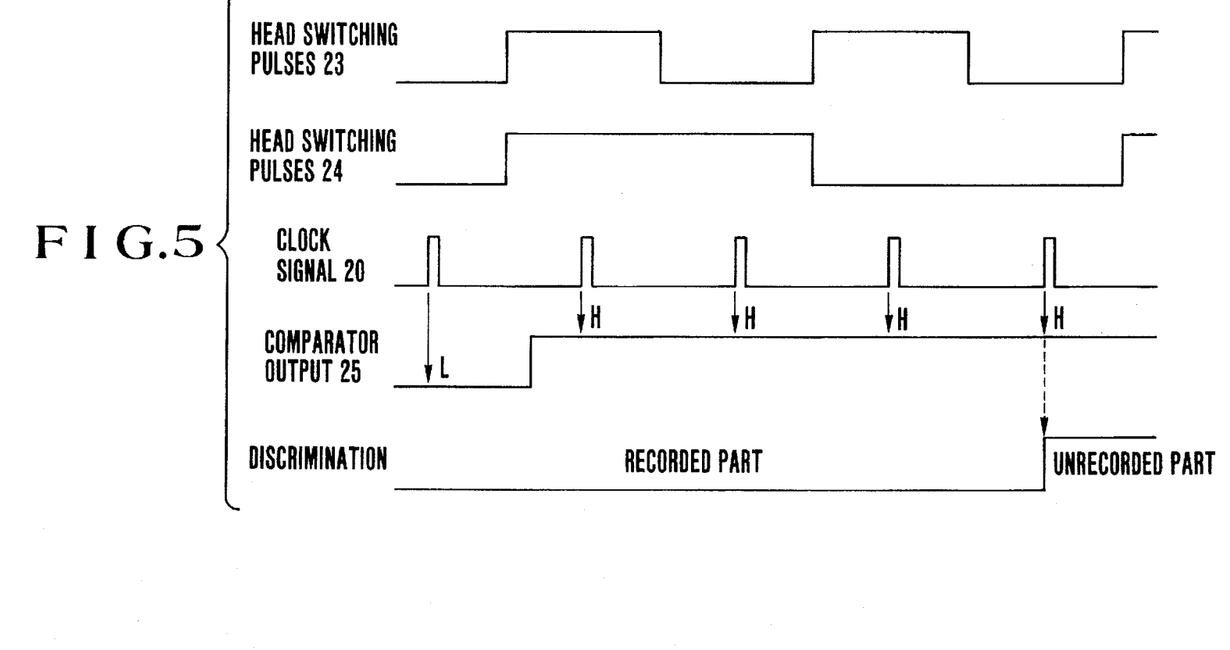
FIG. 5 is a timing chart showing a detecting action for an unrecorded part in the VTR of FIG. 3.

The clock signal 20 which is an input to the shift register 9 is formed in synchronism with the head switching pulse signals as shown in FIG. 5. The clock signal 20 includes one pulse for the same timing point in every field amount of the video signal reproduced by the reproducing heads Ha, Hb, Hc and Hd.

The binary signal outputted from the comparator 7 is sequentially taken in, held and shifted by the shift register 9 in accordance with the clock signal 20. The output of the AND circuit 10 is checked by the microprocessor which is disposed within the servo/system controller 11. When the level of the output of the AND circuit 10 is found to have become high, i.e., when the levels of all the reproduced RF signals obtained by the four reproducing heads become lower than a given value as shown in FIG. 5, the microprocessor determines that an unrecorded part of the tape has been detected.

In accordance with this determination, the servo/system controller 11 controls applicable parts. For example, in the reproduction mode, the reproduced video signal processing circuit 4 is accessed and caused to change the output of the circuit 4 from a reproduced video signal to a self-oscillation image signal such as a blue back signal. Further, in a case where the tape is allowed to travel at a high speed in the blank search, the capstan motor control circuit 18 is controlled and caused to bring the tape travel to a stop; or the VTR is put into a recording standby mode.

With the embodiment arranged in the above-stated manner, the detection signals for the RF signals sequentially reproduced by the plurality of rotary heads are sampled at a given timing in synchronism with the rotation of each rotary head. An unrecorded part of the tape is considered to have been detected when a number of the detection signals corresponding to the number of the rotary heads consecutively show a no-signal state. Therefore, this detecting process can be accomplished in a very short period of time. Further, the unrecorded part detecting action can be reliably accomplished with little error, even under the conditions of different tape transport speeds and different tracking states, because the unrecorded part is determined on the basis of a logical product obtained from the four detection signals.

In this embodiment, the comparator 7, the shift register 9 and the AND circuit 10 are arranged as hardware by using an analog or digital IC. However, the hardware arrangement may be replaced with a software arrangement whereby the output signals of the detection circuit 6 are directly taken in an A/D input port of the microprocessor at the timing of the clock signal 20.

Further, the shift register 9 and the AND circuit 10 may be arranged as software by connecting the output terminal of the comparator 7 to a port of the microprocessor and by reading the output signal of the comparator 7 also at the timing of the clock signal 20.

As described in the foregoing, the rotary-head type reproducing apparatus of the embodiment is arranged to be capable of speedily and accurately detecting an unrecorded part of a tape-shaped recording medium.

Figure 6:
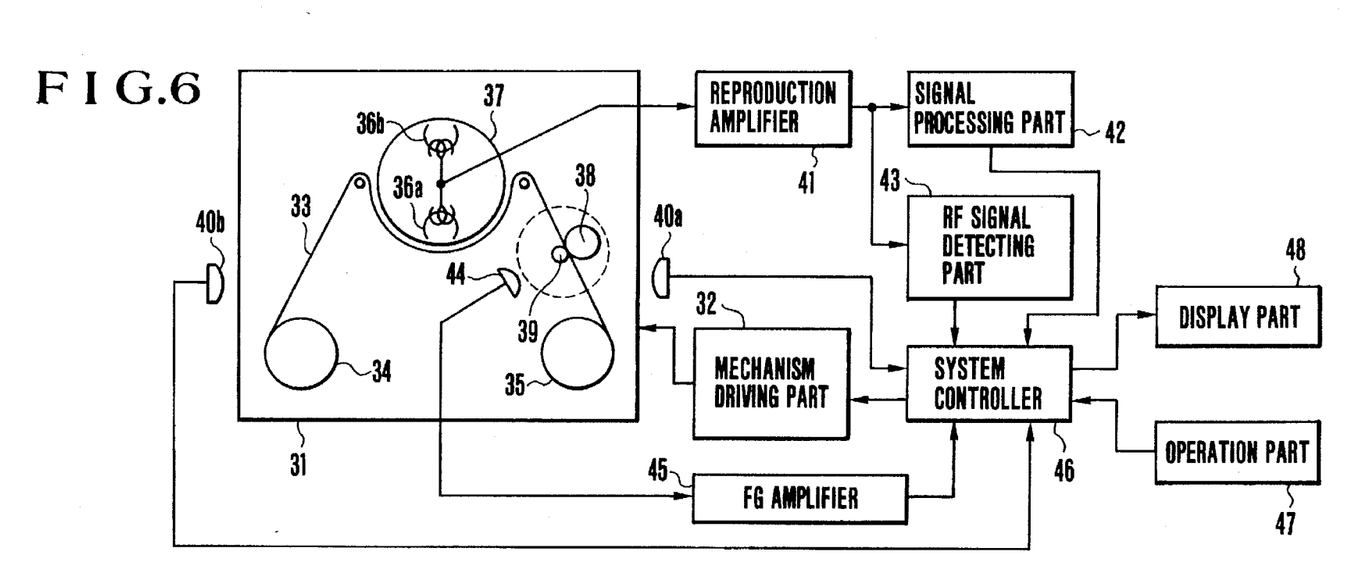
FIG. 6 is a block diagram showing in outline the arrangement of a VTR arranged as another embodiment of the invention.
Figures 7A, 7B:
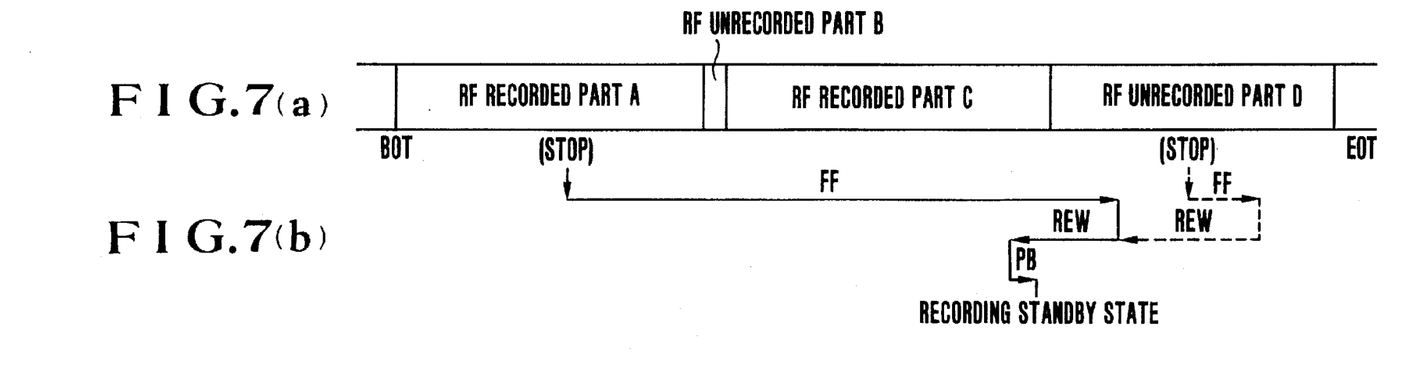
FIGS. 7(a) and 7(b) schematically show a searching action for the record end part in the VTR of FIG. 6.

Next, another embodiment of this invention is described below with reference to the drawings:

FIG. 6 shows the arrangement of a video tape recorder (VTR) which is arranged as another embodiment of this invention. FIGS. 7(a) and 7(b) show a procedure for making a search for a recording startable position.

Figure 8:
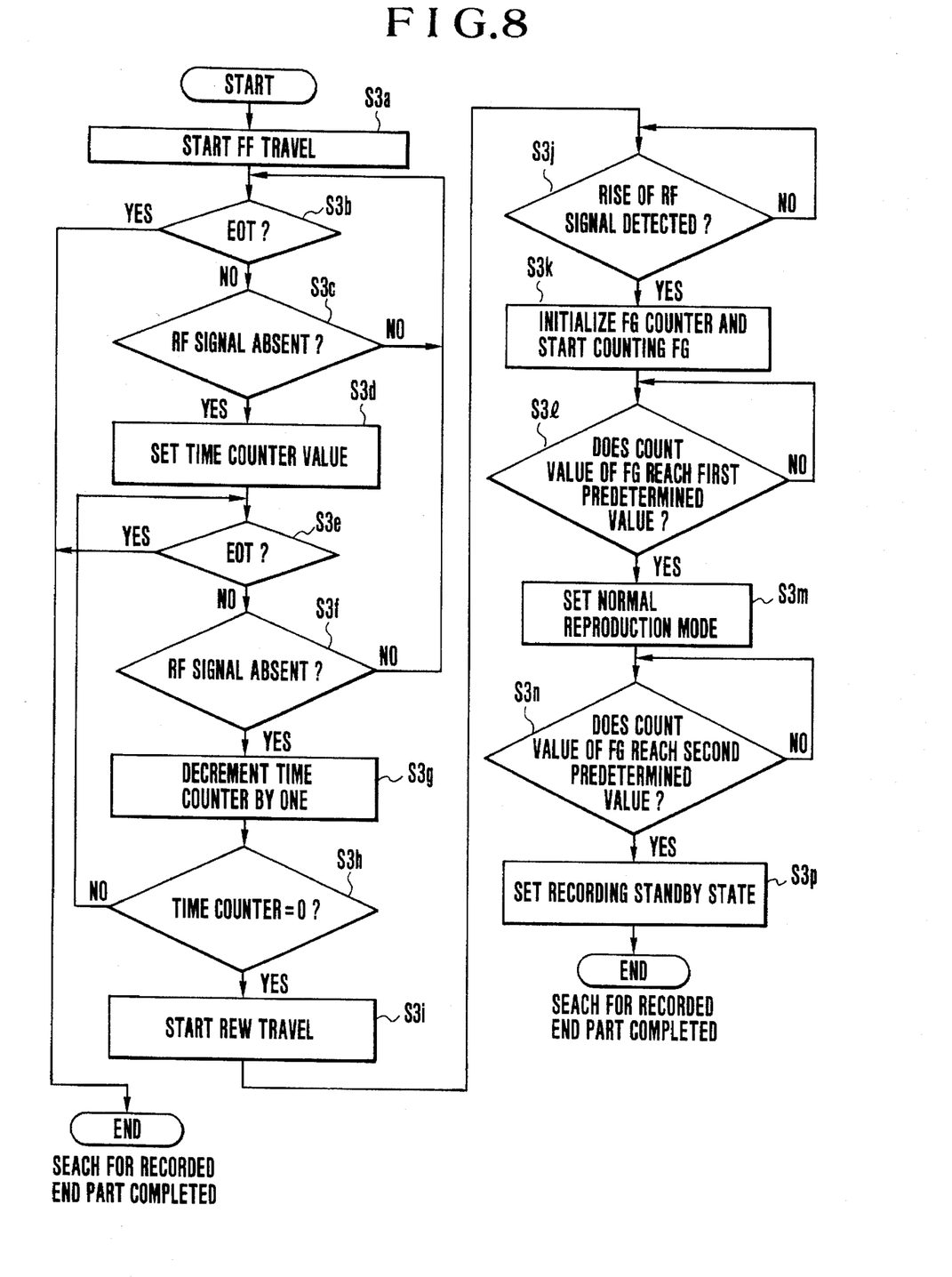
FIG. 8 is a flow chart showing the operation of a system controller in the VTR of FIG. 6.

FIG. 8 is a flow chart showing the operation of a system controller in the VTR. Further, FIG. 6 shows only such parts of the VTR that relate to the search for a recording startable position.

Referring to FIG. 6, a mechanism part 31 is arranged to be put into a desired mode by a mechanism driving part 32, and to cause a magnetic tape 33 to travel according to the mode set. The magnetic tape 33 is stowed within a cassette (not shown) in a state of being wound around a supply reel 34 and a take-up reel 35 and is pulled out, in this state, from the cassette to be wrapped a given degree around and in contact with a rotary drum 37. Recording/reproducing heads 36a and 36b are mounted on the drum 37.

When the mechanism part 31 is set in one of the modes such as the REW travel mode, the FF travel mode, the normal reproduction mode, the magnetic tape 33 is caused to travel either forward or backward by the rotation of a pinch roller 38, a capstan 39, the supply reel 34 and the take-up reel 35. With the magnetic tape 33 caused to travel, signals recorded on the magnetic tape 33 is read out by the heads 36a and 36b.

A sensor 40a is arranged to detect the beginning part of tape (BOT) and another sensor 40b to detect the end of tape (EOT), respectively. These sensors 40a and 40b optically detect a transparent leader tape attached to one end of the magnetic tape and a magnetized part of the tape by means of an infrared diode and a photo transistor which are not shown. Detection signals thus obtained by these sensors 40a and 40b are arranged to be supplied to a system controller 46.

A reproduction amplifier 41 is arranged to amplify the outputs (RF signals) of the heads 36a and 36b up to an apposite level and supplies the amplified signals respectively to a signal processing part 42 and an RF signal detecting part 43. The RF signal detecting part 43 is arranged to supply a prescribed detection signal to the system controller 46 as long as any RF signal is detected from the output of the reproduction amplifier 41.

A capstan FG sensor 44 is arranged to detect the rotation of the capstan 39 and to supply its output to an FG amplifier 45. The FG amplifier 45 is arranged to amplify the output of the sensor 44 to an apposite level and to output a prescribed pulse signal (FG pulses), which is supplied to the system controller 46.

The system controller 46 is arranged to make a search for a recording startable position by shifting the operation mode of the mechanism part 31 to a given mode as will be described later. For this purpose, the system controller 46 supplies a control signal which designates a mode of the mechanism part 31 to the mechanism driving part 32. Further, the system controller 46 is connected to an operation part 47 which is provided for giving operating instructions and also to a display part 48 which is provided for displaying the states of the VTR.

The operation of the embodiment is described below with reference to FIGS. 7(a), 7(b) and 8:

FIG. 7(a) shows a magnetic tape having an RF recorded part A which continues from a leader part of the tape; a very small RF unrecorded part B (such as a joint part of the tape); an RF recorded part C which is divided from the RF recorded part A by the RF unrecorded part B; and an RF unrecorded part D. FIG. 7(b) shows changes taking place in the contact position of the reproducing heads 36a and 36b relative to the magnetic tape 33.

When an instruction is given from the operation part 47 to search the magnetic tape 33 for a recording startable position where recording can be started, the system controller 46 outputs a control signal to cause the mechanism driving part 32 to put the mechanism part 31 into the FF travel mode. The magnetic tape 33 is then caused to travel from its current position at a high speed in the FF travel mode.

In the above-stated FF travel mode, the system controller 46 monitors the output of the RF signal detecting part 43. Upon detection of an RF unrecorded part, a time counter which is disposed within the system controller 46 is caused to begin to count a certain given period of time. If an RF recorded part is detected within this period of time, the count value is reset by bringing the time counter to a stop. The count is caused to be resumed when an RF unrecorded part is again detected. When the given period of time is counted, that is, when an RF unrecorded part is continuously detected for a certain length of time, a control signal is outputted to cause the mechanism driving part 32 to put the mechanism part 31 into the REW travel mode. The magnetic tape 33 is thus caused to travel in the reverse direction. Further, in a case where the end of the tape (EOT) is detected before any RF unrecorded part that continues for a certain length of time is detected in the FF travel mode mentioned above, the search for a recording startable position where recording can be started is brought to a stop by putting the mechanism part 31 into a desired mode.

When the VTR is set in the REW travel mode after detection of an RF unrecorded part which continues for a certain given length of time, the system controller 46 monitors the output of the RF signal detecting part 43 during the process of the tape rewinding action. Upon detection of a rise of the reproduced RF signal indicating the end of a record through the changes in the detection signal of the RF signal detecting part 43, an FG counter which is disposed within the system controller 46 is set at an initial value and is, at the same time, allowed to begin to count FG pulses. In the REW travel mode, the FG pulses are counted (down). When the count value of the FG counter reaches a first given (preset) value, a control signal is outputted to cause the mechanism driving part 32 to put the mechanism part 31 into a normal reproduction mode. The first given value is set at such a time value (normally 1 to 2 sec) that enables the operator to perceive without fail the end of an existing recorded part as a visual image.

While the VTR is in process of the above-stated normal reproducing operation, the system controller 46 monitors the output of the FG amplifier 45 and makes the FG counter continuously count (up) the FG pulses. When the count value of the FG counter reaches a second given (preset) value, the system controller 46 outputs a control signal to cause the mechanism driving part 32 to set the mechanism part 31 into a recording standby state and the search for the end part of the existing record comes to an end. The second given value is obtained by subtracting from the above-stated initial value a value set in correspondence to an extent of tape travel required for obtaining an optimum position for tag recording. Although the second given value varies with the apparatus, it is set, for example, at a value obtained by subtracting from an initial value a value which corresponds to the extent of tape travel for several to ten-odd frames.

After completion of the search for the end of the existing record in the above-stated manner, the heads are positioned at the end part of the RF recorded part C without detecting the end part of the RF recorded part A which is recorded on the magnetic tape in a divided state. Tag recording from this head position enables signals to be recorded in a part following the RF recorded part C.

An advantageous feature of the VTR described lies in that a recorded part in the neighborhood of the end part of the existing record is arranged to be reproduced after the end part is detected. This arrangement enables the operator to immediately find whether the detected end part is the part desired by the operator.

Another advantage of the VTR of the embodiment described lies in that the VTR is arranged to be set into a recording standby mode after detection of the record end part. That arrangement permits smooth change-over to a next recording (or shooting) operation.

Further, in the embodiment described, the instruction which is given from the operation part 47 to make a search for a recording startable position on the tape does not have to be directly given. For example, the search may be arranged to be made when the power supply switch of the VTR is turned on, or to be made in response to an instruction given from a pheripheral equipment such as a personal computer, an editor or a remote controller. The count of the FG pulses for the rotation of the capstan may be replaced with the count of a tape counter or with a time count after confirmation of the normal reproduction mode.

Further, while this invention is applied to a VTR in the case of the embodiment described, the invention is of course applicable also to other magnetic tape recording/reproducing apparatuses of varied kinds.

Next, control over the operation of this embodiment is described below with reference to FIG. 8 which is a flow chart:

After the start of operation, the FF travel of the tape is allowed to begin at a step S3a. At a step S3b: A check is made for the end of tape (EOT). If the VTR is not at the EOT, the flow of operation proceeds to a step S3c. If the tape is at the EOT, the flow comes to an end. At the step S3c: A check is made for the absence of any record of an RF signal. If no RF signal is found, the flow comes to a step S3d to set a count value for the time counter. If any RF signal record is found at the step S3c, the flow comes back to the step S3b. With the value of the time counter having been set at the step S3d, the flow of operation comes to a step S3e. At the step S3e: A check is made for the EOT. If the tape is found to be at the EOT, the flow of operation comes to the end. If not, the flow proceeds to a step S3f. At the step S3f: A check is made for the absence of any RF signal record. If no RF signal record is found, the flow comes to a step S3g. At the step S3g: The count value of the time counter is decremented by one. If any RF signal record is found at the step S3f, the flow comes back to the step S3b. The flow proceeds from the step S3g to a step S3h. At the step S3h: A check is made to find if the count value of the time counter is zero. If so, the flow proceeds to a step S3i. If not, the flow comes back to the step S3e. At the step S3i: The REW travel is allowed to begin. The flow proceeds from the step S3i to a step S3j. At the step S3j: A check is made to find if a rise of the RF signal has been detected. If so, the flow comes to a step S3k. At the step S3k: The FG counter is initialized and allowed to begin counting the FG pulses. At a step S3l: A check is made to find if the count value of the FG counter has reached a first given value. If so, the flow comes to a step S3m to set the VTR in the normal reproduction mode. The normal reproducing operation begins. At a step S3n: A check is made to find if the count value of the FG counter has reached a second given value. If so, the flow comes to a step S3p to set the VTR into a recording standby state. The search for the end part of an existing record has come to an end. Further, in a case where the result of the check made at each of the steps S3j, S3l and S3n is "NO", the preceding steps are repeated until the result of the check becomes "YES".

In accordance with this invention, the counting means is arranged to be initialized at the real end part of the existing record even while the tape-shaped recording medium (the tape) is in a state of being transported at a high speed, as described in the foregoing. This arrangement enables the heads to be correctly positioned relative to the end part of the existing record. The invented arrangement thus permits an accurate and speedy search for the real end part of any existing record on the tape.

What is claimed is:

1. An information signal recording and/or reproducing apparatus comprising:
   a) a plurality of rotary heads arranged to sequentially trace a tape-shaped recording medium;
   b) detection means for detecting signals sequentially reproduced by said plurality of rotary heads;
   c) extracting means for sequentially extracting outputs of said detection means for every one of said plurality of rotary heads;
   d) memory means for sampling and holding the outputs of the extracting means for each of the plurality of rotary heads in association with the rotation of the plurality of rotary heads;
   e) means for logic integration of the outputs of the extracting means for said each head held by the memory means; and
   f) discriminating means for determining a non-recorded area relative to an information signal on said recording medium on the basis of a logical product obtained from the integration of the outputs of said extracting means relative to all of the plurality of rotary heads.

2. An apparatus according to claim 1, wherein said means for logic integration includes logical product means for obtaining a logical product of the outputs of said extracting means for all of said plurality of rotary heads.

3. An apparatus according to claim 1, further comprising transport means for transporting the tape-shaped recording medium in a longitudinal direction thereof, and control means for controlling said transport means according to an output of said discriminating means.

4. An apparatus according to claim 1, further comprising reproducing means for reproducing the information signal from the signals sequentially reproduced by said plurality of rotary heads.

5. An apparatus according to claim 4, further comprising replacing means for replacing the information signal reproduced by said reproducing means with another signal according to an output of said discriminating means.

6. An information signal recording and/or reproducing apparatus comprising:
   a) a plurality of rotary heads arranged to sequentially trace a tape-shaped recording medium;
   b) detecting means for respectively detecting the presence or absence of a reproduced signal from said plurality of rotary heads;
   c) memory means for sampling and holding outputs of the detecting means for each of the plurality of rotary heads in association with the rotation of the plurality of rotary heads;
   d) means for logic integration of the outputs of the detecting means for said each head held by the memory means; and
   e) discriminating means for determining a non-recorded area relative to an information signal on the recording medium on the basis of a logical product obtained from the integration of the outputs of said detecting means relative to all of the plurality of rotary heads.

7. An apparatus according to claim 6, wherein said detecting means includes a switching circuit arranged to sequentially output signals reproduced by said plurality of heads, a detection circuit arranged to detect an output of said switching circuit, and wherein said memory means includes a sampling circuit arranged to sample an output of said detection circuit for each of said plurality of heads.

8. An apparatus according to claim 7, wherein said memory means further includes a register for outputting, in parallel, sampling outputs of said sampling circuit obtained respectively for said plurality of heads.

9. An apparatus according to claim 8, wherein said means for logic integration includes an AND circuit arranged to obtain a logical product of the sampling outputs outputted in parallel from said register.

10. An information signal recording and/or reproducing apparatus comprising:

a) transport means for transporting a tape-shaped recording medium;

b) a rotary head arranged to trace the tape-shaped recording medium;

c) discriminating means for discriminating between recording and unrecording of an information signal on the tape-shaped recording medium by using a signal reproduced from the tape-shaped recording medium by said rotary head;

d) pulse generating means for generating pulses according to the transport of the tape-shaped recording medium;

e) count means for counting the pulses generated by said pulse generating means;

f) control means for controlling an action of said transport means and that of said count means in response to said discriminating means, said control means being arranged to cause the tape-shaped recording medium to be transported in a direction reverse to the direction in which the tape-shaped recording medium is transported during recording, in response to said discriminating means detecting the unrecording of the information signal for a predetermined given period of time or more, and to initialize said count means in response to said discriminating means detecting the recording of the information signal in process of transporting the tape-shaped recording medium in the reverse direction; and g) reproducing means for reproducing the information signal from the signal outputted from said rotary head, and wherein said control means is arranged to cause said reproducing means to operate when the count value of said count means reaches a predetermined value after the recording of the information signal is detected in process of transporting the tape-shaped recording medium in the reverse direction.

11. An apparatus according to claim 10, wherein said control means is arranged to cause the tape-shaped recording medium to be transported in the same direction as the direction in which the tape-shaped recording medium is transported during recording, after the recording of the information signal is detected in process of transporting the tape-shaped recording medium in the reverse direction, and to stop the tape-shaped recording medium from being transported when a count value of said count means reaches another predetermined value which differs from said predetermined value.

12. An apparatus according to claim 11, further comprising reproducing means for reproducing the information signal from the signal outputted from said rotary head, and wherein said control means is arranged to cause said reproducing means to operate while the tape-shaped recording medium is transported in the same direction as the direction in which the tape-shaped recording medium is transported during recording.

13. An apparatus according to claim 11, wherein said control means is arranged to stop the tape-shaped recording medium from being transported and to set said apparatus into a recording standby state when the count value of said count means reaches a value obtained when said count means is initialized.

14. An information signal recording and/or reproducing apparatus comprising:

(a) transport means for transporting a tape-shaped recording medium;

(b) a rotary head arranged to trace the tape-shaped recording medium;

(c) discriminating means for discriminating between recording and unrecording of an information signal on the tape-shaped recording medium by using a signal reproduced from the tape-shaped recording medium by said rotary head;

(d) pulse generating means for generating pulses according to the transport of the tape-shaped recording medium;

(e) count means for counting the pulses generated by said pulse generating means;

(f) control means for controlling an action of said transport means and that of said count means in response to said discriminating means, said control means being arranged to cause the tape-shaped recording medium to be transported in a direction reverse to the direction in which the tape-shaped recording medium is transported during recording, in response to said discriminating means detecting the unrecording of the information signal for a predetermined given period of time or more, and to set an initialized value on said count means in response to said discriminating means detecting the recording of the information signal in the process of transporting the tape-shaped recording medium in the reverse direction, said control means being arranged to cause the tape-shaped recording medium to be transported in the same direction as the direction in which the tape-shaped recording medium is transported during recording, after the recording of the information signal is detected in the process of transporting the tape-shaped recording medium in the reverse direction, and to stop the tape-shaped recording medium from being transported when a count value of said count means reaches a predetermined value before reaching said initialized value; and (g) reproducing means for reproducing the information signal from the signal output from said rotary head, and wherein said control means is arranged to cause said reproducing means to operate when the count value of said count means reaches another predetermined value which differs from said predetermined value, after the recording of the information signal is detected in the process of transporting the tape-shaped recording medium in the reverse direction.

* * * * *

UNITED STATES PATENT AND TRADEMARK OFFICE
CERTIFICATE OF CORRECTION

PATENT NO. : 5,644,447
DATED : July 1, 1997
INVENTOR(S) : Takayama et al.

It is certified that error appears in the above-identified patent and that said Letters Patent is hereby corrected as shown below:

Col. 9, line 47, delete "S31" and insert -- S3₂ --.

Col. 9, line 57, delete "S31" and insert -- S3₂ --.

Signed and Sealed this

Fifteenth Day of December, 1998

Attest:

BRUCE LEHMAN

Attesting Officer

Commissioner of Patents and Trademarks